United States Patent [19]

Soja

[11] 4,017,946
[45] Apr. 19, 1977

[54] LOCK SCREW FOR RIGGING CONNECTOR OR THE LIKE

[75] Inventor: Frank John Soja, Sun Valley, Calif.
[73] Assignee: Alta Engineering, Inc., Burbank, Calif.
[22] Filed: Mar. 1, 1976
[21] Appl. No.: 662,343

[52] U.S. Cl. .......................... 24/265 AL; 24/31 B; 24/201 L; 151/41.75
[51] Int. Cl.² .......................................... A44C 5/18
[58] Field of Search ............ 24/31 R, 31 B, 265 R, 24/265 AL, 73 A, 201 L, 201 LP, 33 R, 33 A, 230 NP; 151/51, 69, 57, 41.74, 41.75; 16/DIG. 24

[56] References Cited

UNITED STATES PATENTS

| | | | |
|---|---|---|---|
| 2,746,116 | 5/1956 | Craven | 24/265 AL |
| 3,065,513 | 11/1962 | Warner et al. | 24/265 AL |
| 3,583,045 | 6/1971 | Coyle | 24/265 AL |

Primary Examiner—G. V. Larkin
Attorney, Agent, or Firm—Flam & Flam

[57] ABSTRACT

A pair of companion hardware parts are connected together by a screw in order to close a link for webbing components of a drag chute or the like. One of the parts provides a threaded hole for the screw and the other of the parts provides a recess for accommodating the head of the screw and also provides an access opening for passage of the screw shank for engagement with the threaded hole. A spring retainer is detachably received in an internal groove of the recess. The retainer has a key that interfits keyways in the screw head and the recess whereby the screw is locked in place notwithstanding vibration and shock. No part of the mechanism projects beyond the recess. Hence it cannot catch or snag. Desirably a tang extends diagonally from the retainer in order to block access to the screw to inhibit attempted removal by an untrained or unauthorized person.

9 Claims, 5 Drawing Figures

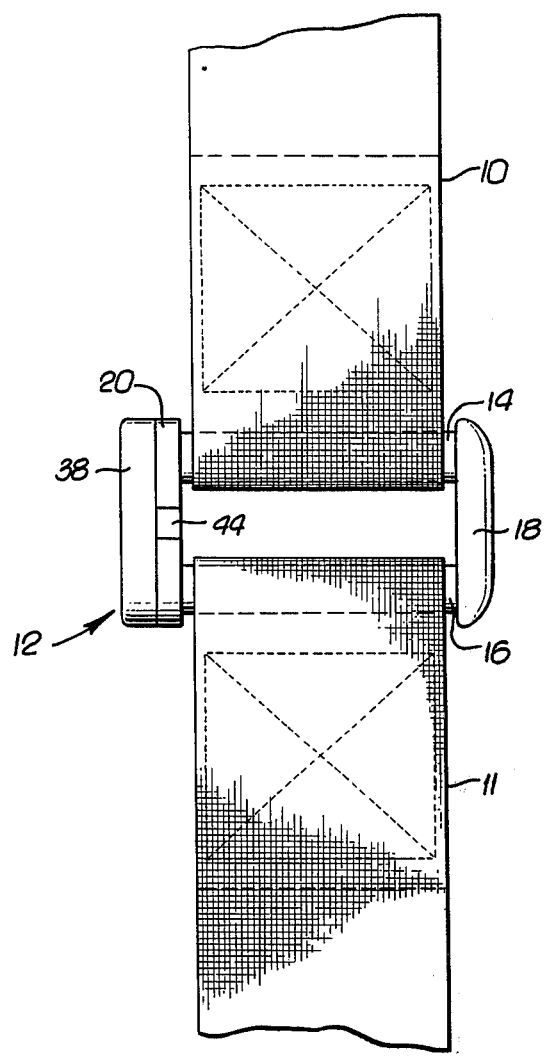
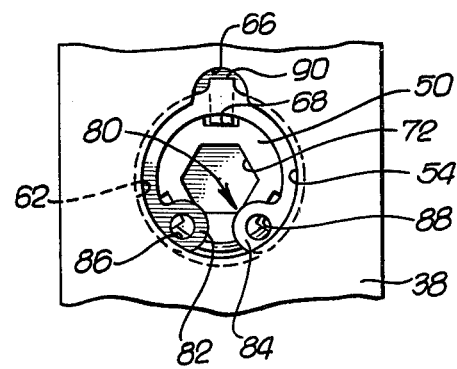
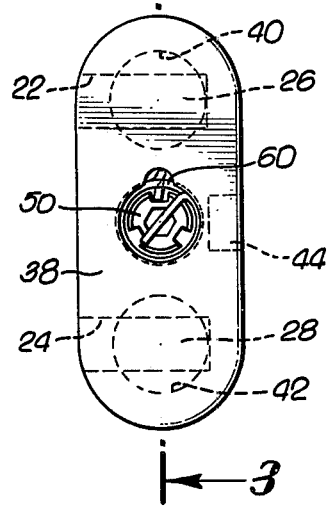
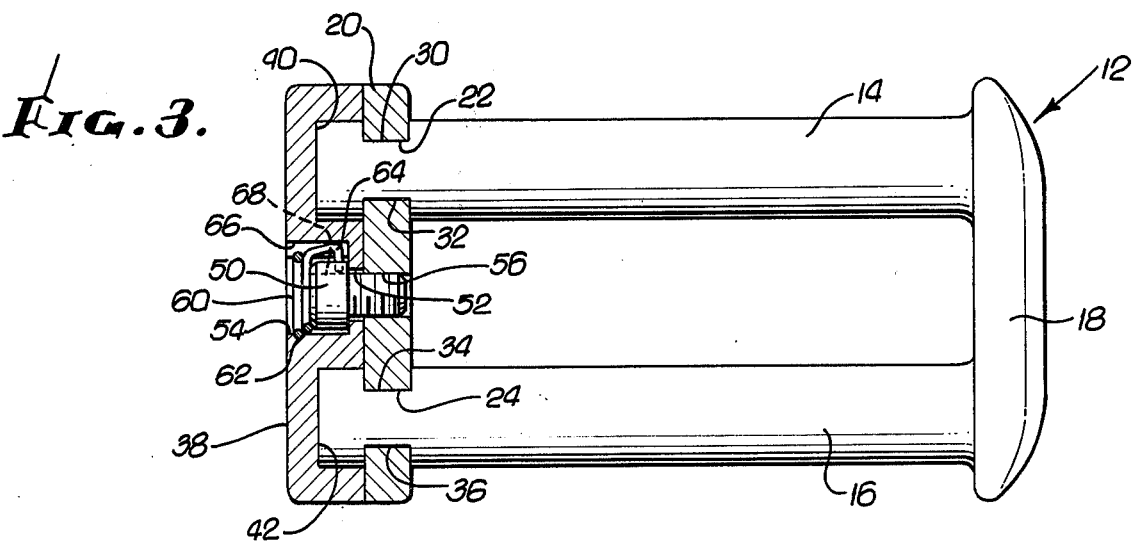

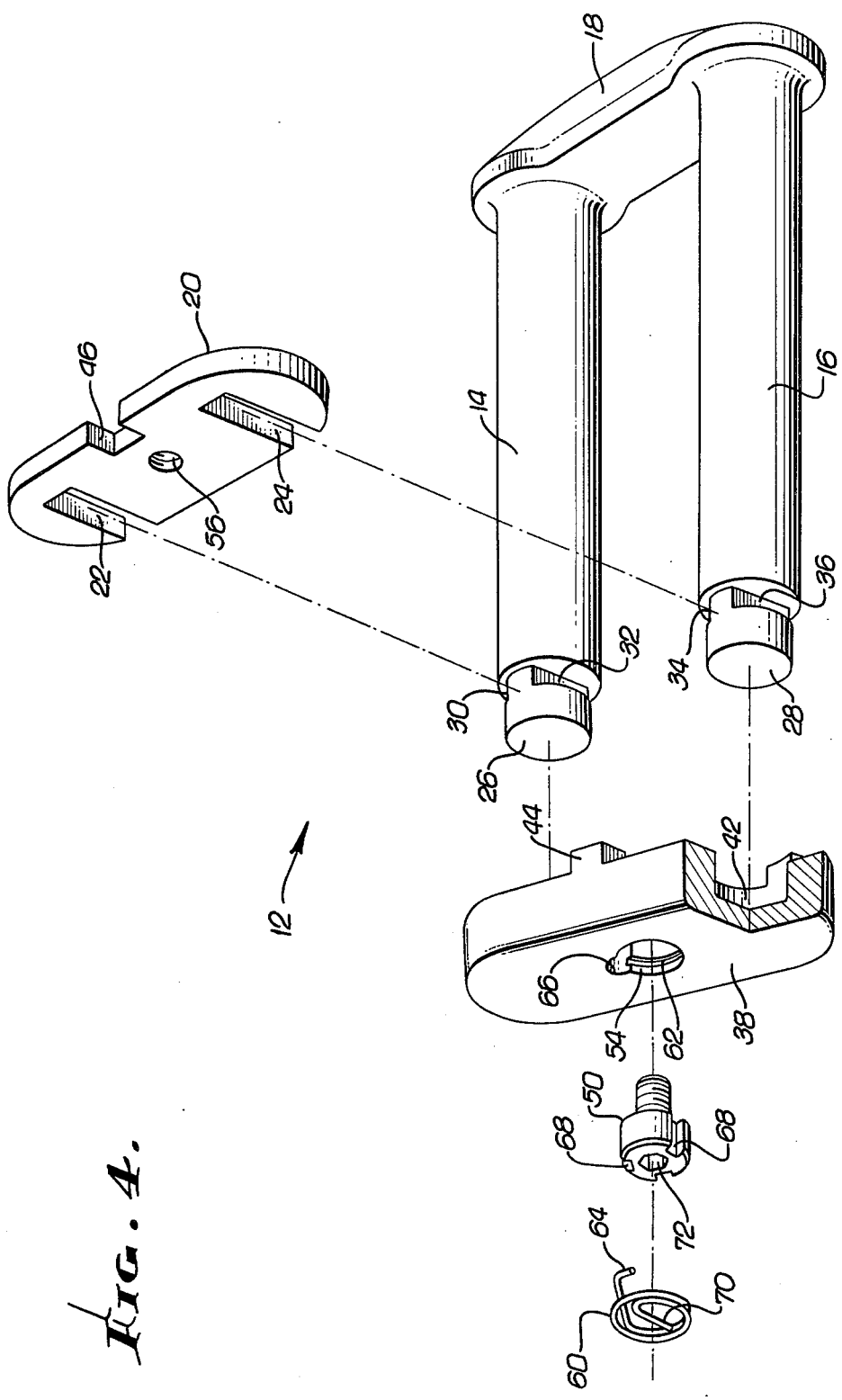

LOCK SCREW FOR RIGGING CONNECTOR OR THE LIKE

FIELD OF INVENTION

This invention relates to fastening devices, and particularly to a new and improved general purpose anti-rotational lock mechanism for a screw particularly useful for securing a connector for parachute rigging or the like.

BACKGROUND OF THE INVENTION

Numerous hardware items include companion parts detachably secured together by screw means. It is often desirable to secure the companion parts together with positive assurance that they will not accidentally separate notwithstanding heavy shock and vibration and notwithstanding brushing contact with surrounding structures or elements. Desirably the locking device comprises extremely simple and inexpensive components.

A specific application for such a locking device is in a connector for the webbing of a parachute brake for carrier aircraft.

SUMMARY OF INVENTION

In order to provide a locking structure for the foregoing application and which meets the general criteria above enumerated, I provide a recess in one of the companion hardware parts that surrounds the screw. A retaining element in the form of a coil or snap ring is received in an internal groove of the recess and provides an axially extending key that interlocks radially aligned keyways in the recess and the screw head. In a preferred form of the present invention, the retaining element has a tang that blocks access to the tool engaging part of the screw so that attempted disengagement by an unindoctrinated mechanic or unauthorized person is prevented.

BRIEF DESCRIPTION OF DRAWINGS

A detailed description of the invention will be made with reference to the accompanying drawings wherein like numerals designate corresponding parts in the several figures. These drawings are to scale.

FIG. 1 is a plan view showing two webbing components and a connector therebetween.

FIG. 2 is a side elevational view of the connector.

FIG. 3 is a sectional view of the connector, and taken along a plane corresponding to line 3—3 of FIG. 2.

FIG. 4 is an exploded view of the connector components.

FIG. 5 is a side elevational view of a modified retaining element for the locking device.

DETAILED DESCRIPTION OF PREFERRED EMBODIMENT

The following detailed description is of the best presently contemplated modes of carrying out the invention. This description is not to be taken in a limiting sense, but is made merely for purposes of illustrating the general principles of the invention since the scope of the invention is best defined by the appended claims. Structural and operational characteristics attributed to forms later described, unless such characteristics are obviously inapplicable or unless specific exception is made.

In FIG. 1, companion webbing elements 10 and 11 are illustrated that are secured together by a link or connector 12. Conventionally, the connector 12 includes a pair of cylindrical posts and 16 projecting in spaced parallel relationship from ends of a bight or base plate 18. The posts 14 and 16 extend into and beyond respective looped ends of the webbing elements 10 and 11.

The connector also includes a yoke 20 (see also FIG. 4 that bridges the distal ends of the posts in order to close the connector about the webbing elements. The yoke is a generally flat plate having spaced parallel rectangular recesses 22 and 24 at one side edge designed to interfit reduced cylindrical ends 26 and 28 of the posts 14 and 16. For this purpose, the post ends 26 and 28 are each slotted on opposite sides, as at 30, 32 and 34, 36. The yoke 20 and the posts 14, 16 connect and disconnect only by transverse movement of the yoke 20 relative to the posts 14 and 16. Movement of the yoke parallel to the posts 14 and 16 is prevented by the interfit of the recesses 22 and 24 with the slots 30, 32 and 34, 36.

The webbing elements 10 and 11, by way of example, may connect respectively to a parachute and to the frame of a carrier based aircraft. Quite obviously it is important that the yoke be positively but releasably locked in place. For this purpose, a locking plate 38 is provided. The locking plate has two circular holes or sockets 40 and 42 that fit those portions of the reduced post ends 26 and 28 that project beyond the yoke 20. In the assembled position, the locking plate 38 and the yoke 20 are side by side as shown in FIG. 3. With the locking plate in position, the yoke is prevented from lateral movement or separation from the posts. For this purpose, the locking plate 38 has a locking projection 44 (FIG. 4) that enters a slot 46 formed in the corresponding edge of the yoke 20. Of course the yoke is so locked in place only when the locking plate is secured to the posts 14 and 16.

In order to secure the locking plate 38 to the posts 14, 16, a screw 50 is provided. This screw has a shank portion that extends through a clearance opening 52 (FIG. 3) in the bottom of outwardly opening recess 54 in the locking plate and into engagement with a female fastener element in the form of a threaded hole 56 in the yoke 20. When the screw 50 properly engages the hole 56, the yoke cannot release by moving laterally by virtue of the interengagement between the locking plate 38 and the posts 14, 16. Similarly the locking plate cannot release by longitudinal movement by virtue of the screw engagement with the yoke which, by virtue of the recess and slot arrangement cannot move longitudinally.

The recess 54 suitably shields the head of the screw 50 so that the outer exterior surface of the locking plate is flat. Nothing can snag the screw 50.

Vibration and/or shocks may nevertheless tend to work the screw loose. To prevent this, a retaining element 60 is provided. The retaining element 60, as shown in FIG. 4 is a tightly wound coil having about two turns. The retaining element may be placed in an internal groove 62 near the outer end of the locking plate recess 54 (FIG. 3). When so situated, the resilience of the coil prevents it from becoming dislodged. For this purpose, the nominal outside diameter of the retaining member 60 is slightly larger than the diameter of the recess 54.

The retaining member interfits both the locking plate 38 and the head of the screw 50. For this purpose, the member 60 has a key 64 formed as an axially and then radially inwardly directed extension of the coil material. The key 64 extends into a keyway 66 of the locking plate recess 54 and one of a number (three in this instance) of companion keyways 68 in the head of the screw.

The retaining member is easily installed by a simple manipulation assisted, if desired, by a small hand tool such as long-nosed pliers. The retaining member is engaged for this purpose by the aid of a transverse or diagonally extending tang 70 (FIGS. 2 and 4) formed as an extension of the coil material at the end opposite the key 64. By an equally simple manipulation, the retaining member is readily removed whereby the screw can be detached. When the retaining member is in place, the tang 70 blocks access to the tool engaging slot or recess 72 in the head of the screw to prevent attempted disengagement by an unindoctrinated mechanic or unauthorized person. The retaining member 60, like the screw itself, is shielded from the surrounding elements within the locking plate recess 54.

The screw 50 is effectively held in place notwithstanding heavy shock and vibration loads, providing the requisite reliability. Nonetheless, intentional disengagement is easily achieved.

DESCRIPTION OF MODIFIED FORM

In the form of the invention illustrated in FIG. 5, a retaining member in the form of a snap ring 80 is provided. The snap ring 80 has opposed ends 82 and 84 provided with apertures 86 and 88 for engagement with a suitable tool for installation and removal, all in a conventional manner. The snap ring 80 has a key 90 formed as an axial projection for engagement with the locking plate keyway 66 and screw head keyway 68. In the present instance, the retaining member 80 has no element to block access to the screw head socket 72 although a tang could be provided if desired.

Intending to claim all novel, useful and unobvious features shown or described, I make the following Claims:

1. In a locking device:
   a. a pair of companion hardware parts adapted to be locked together;
   b. one of said hardware parts having a threaded female fastener element;
   c. said other of said hardware parts having a recess facing outwardly, there being an access opening in the bottom of said recess registrable with said female fastener element;
   d. a screw in said recess having a shank extended through said access opening and threadedly engaging said female fastener element;
   e. said screw having a head entirely accommodated in said recess;
   f. said recess having, near its outer end, an internal groove;
   g. said recess and said head having companion keyways; and pl h. a spring retaining member snapped in said groove, said retaining member having a key extending into both of said keyways whereby said screw is releasably retained in position notwithstanding shock and vibration.

2. The locking device as set forth in claim 1 in which said spring retaining member also has a tang extending generally diametrically to overlie the head of said screw whereby attempted screw removal by an untrained or unauthorized person is inhibited.

3. The locking device as set forth in claim 1 in which said spring retaining member is a tightly coiled element with one end extending axially and then radially to form said key.

4. The locking device as set forth in claim 3 in which the other end of said tightly coiled element extends generally diametrically to overlie the head of said screw whereby attempted screw removal by an untrained or unauthorized person is inhibited.

5. In a locking device:
   a. a pair of companion hardware parts adapted to be locked together;
   b. a link having a pair of generally parallel posts extending from a bight to extend through a pair of elements to be connected;
   c. one of said hardware parts being a yoke for bridging said posts, said yoke having recess means at one side edge;
   d. said posts having, adjacent their distal ends, slot means for interfitting the side edge recess means of said yoke upon transverse movement of said yoke relative to said posts;
   e. the other of said hardware parts being a locking plate having a pair of holes or sockets to receive the distal ends of said posts and to extend alongside said yoke;
   f. said yoke having a threaded female fastener element;
   g. said locking plate having an outwardly facing recess, there being an access opening in the bottom of said recess registrable with said female fastener element;
   h. a screw in said recess having a shank extended through said access opening and threadedly engaging said female fastener element;
   i. said screw having a head entirely accommodated in said recess;
   j. said recess having, near its outer end, an internal groove;
   k. said recess and said head having companion keyways; and
   l. a spring retaining member snapped in said groove, said retaining member having a key extending into both of said keyways whereby said screw is releasably retained in position notwithstanding shock and vibration.

6. The locking device as set forth in claim 5 in which said spring retaining member also has a tang extending generally diametrically to overlie the head of said screw whereby attempted screw removal by an untrained or unauthorized person is inhibited.

7. The locking device as set forth in claim 5 in which said spring retaining member is a tighly coiled element with one end extending axially and then radially to form said key.

8. The locking device as set foth in claim 5 in which the other end of said tighly coiled element extends generally diametrically to overlie the head of said screw whereby attempted screw removal by an untrained or unauthorized person is inhibited.

9. The locking device as set foth in claim 5 together with a pair of webbing elements connected by said link.

* * * * *